United States Patent Office 3,215,666
Patented Nov. 2, 1965

3,215,666
PROCESS FOR THE PRODUCTION OF METHYL-POLYSILOXANE OXYMETHYLENE COPOLYMERS
Walter Simmler, Cologne-Munich, Germany, assignor to Farbenfabriken Bayer Aktiengesellschaft, Leverkusen, Germany, a corporation of Germany
No Drawing. Filed May 11, 1961, Ser. No. 109,242
Claims priority, application Germany, May 25, 1960, F 31,309
7 Claims. (Cl. 260—46.5)

The invention relates to a process for the production of methyl-siloxane polymers with the characteristic grouping $$\equiv Si-CH_2-O-Si\equiv$$

wherein methyl siloxane units are attached to each C and O.

Of compounds with this grouping there has hitherto been known only the polymer-homologue series of those compounds which consist exclusively of units of the formula $-Si(CH_3)_2-CH_2-O-$ and produced by condensation by means of CaO from 1,3-di-(hydroxymethyl)-1,1,3,3-tetramethyl-disiloxane. The latter is obtained by transesterification of its carboxylic acid ester which itself is obtained by the reaction of a salt of carboxylic acid with 1,3-di-(chloromethyl)-1,1,3,3-tetramethyl-disiloxane. The foresaid three reaction steps are cumbersome and involve substantial loss in yield.

It has now been found that bromomethyl-substituted siloxanes may be reacted, in contrast to analogous chlorine compounds, in a one-step and also otherwise very simple reaction with methyl-polysiloxanes of almost any structure in the presence of potassium hydroxide to form directly mixed polymers containing the aforementioned grouping. For this purpose there is reacted according to the invention a bromine-substituted methyl-polysiloxane of the general formula $$(BrCH_2)_a(CH_3)_{n-a}SiO_{\frac{4-n}{2}}$$

with a methyl-polysiloxane of the general formula $$(CH_3)_nSiO_{\frac{4-n}{2}}$$

which is either liquid or dissolved in an inert liquid in the presence of at least 1 mol KOH per each gram-atom of bromine at a temperature above 0° C., preferably between 70 and 180° C. In the above formulae $a$ denotes a positive number not more than 2, and $n$ a number more than 1 and not more than 3.

The reaction can be carried out in an inert solvent such as toluene, this being especially advantageous when the choice of the reaction components leads to a highly viscous product, or when the proportion of methylbromomethyl-polysiloxane to the second siloxane component is especially high. In the one case, the solvent facilitates the filtration of the aqueous potassium bromide deposit formed in the reaction, in the other case, it prevents a possible over-heating brought about by a great heat evolution.

In contrast to the chloromethyl siloxanes, the linkage between the methylene group and silicon remains intact; merely, the carbon-bound bromine goes over into potassium bromide which, together with the water resulting from the KOH, forms the only by-product. The copolymers of methylpolysiloxane and oxymethylene obtained according to the present process are suitable as intermediates for the modification of organic plastics especially those whose stability to hydrolysis needs improvement, and as surface-active agents, for example as emulsifiers of aqueous organopolysiloxane emulsions, especially when the siloxane coating prepared therefrom is to be exposed to higher temperatures than tolerated by a purely organic emulsifier.

The following examples are given for the purpose of illustrating the invention.

Example 1

A mixture of 350 g. of octamethyl-cyclotetra-siloxane and 56 g. of potassium hydroxide is heated to 100° C. with stirring, and 151 g. of 1,3-di-(bromomethyl)-1,1,3,3-tetramethyl disiloxane are then added dropwise in the course of 2 hours. The temperature is maintained for a further 2 hours, carbon dioxide is introduced after cooling to neutralize the residual potassium hydroxide, the mixture is filtered and the filtrate is blown out with nitrogen at 180° C./10 mm. Hg. 405 g. of an oil are obtained of the following composition $$(CH_3)_2SiCH_2OSi(CH_3)_2O \cdot 3.7Si(CH_3)_2O$$

as recurring structural units and having the following physical properties:

Density (20° C.) _____ g./cc__ 0.975
Viscosity (20° C.) _____ cp__ 232
Refractive index, $n_D^{20}$ _____ 1.4057
Flash point _____ ° C.__ 278

Example 2

A mixture of 3500 g. of octamethyl-cyclotetra-siloxane and 20.5 g. of potassium hydroxide are heated to 170° C. and 50.5 g. of 1,3-di-(bromomethyl)-1,1,3,3-tetramethyl-disiloxane are then added dropwise in the course of 30 minutes. The temperature is maintained for a further 5 hours, the mixture is cooled, carbon dioxide is introduced and the filtrate blown out with nitrogen at 180° C./10 mm. Hg. The oil thus obtained in a yield of 3480 g. has the following physical properties:

Density (20° C.) _____ 0.976
Viscosity (20° C.) _____ cp__ 6720
Refractive index, $n_D^{20}$ _____ 1.4047
Flash point _____ ° C.__ 282

Example 3

180 g. of α-ω-bis-(trimethylsiloxy)-polydimethyl-siloxane having a viscosity of 150 cp. (20° C.), 120 g. of the hydrolysis product of methyl-bromomethyl-dichlorosilane and 44 g. of potassium hydroxide are mixed and the mixture is heated at 170° C. for 4 hours. After cooling, carbon dioxide is introduced to neutralize the residual potassium hydroxide, the product is filtered and the filtrate blown out with nitrogen at 180° C./10 mm. Hg. 223 g. of an extremely high viscous, scarcely flowing copolymer are obtained consisting of units of the formulae $Si(CH_3)_3O_{1/2}$, $Si(CH_3)_2O$ and $CH_3(SiCH_2)O_{3/2}$.

I claim:

1. The process for the preparation of methyl-polysiloxane oxymethylene copolymers composed of randomly distributed siloxane units selected from the group consisting of the dimethyl-siloxane unit, the dimethyl-oxymethyl-siloxane unit and the methyl-oxymethyl-siloxane unit and terminated by a member selected from the group consisting of the hydroxyl radical and the trimethylsiloxane unit which comprises reacting (1) a linear bromine substituted methyl-polysiloxane selected from the group consisting of 1,3-di-(bromomethyl)-tetramethyl disiloxane and a hydroxyl-terminated polymer composed of methyl-bromo-methylsiloxane units, the latter having been obtained by treating methyl-bromomethyl-dichlorosilane with an excess of water, with (2) a methyl polysiloxane selected from the group consisting of a cyclic dimethyl-siloxane polymer, a hydroxyl-terminated linear dimethyl-siloxane polymer, and a trimethylsiloxy terminated linear dimethyl-siloxane polymer,
in a proportion of from 1 to 15 dimethyl siloxane units per bromine atom and in the presence of at least 1 mol KOH per gram atom bromine at a temperature above 0° C. and recovering the copolymer thereby formed.

2. The process according to claim 1 wherein said reaction is effected at a temperature between 70 and 180° C.

3. The process according to claim 1 wherein said bromine substituted methylsiloxane is 1,3-di-(bromomethyl)-1,1,3,3-tetramethyl disiloxane and said methylpolysiloxane is octamethyl-cyclotetra-siloxane.

4. The process according to claim 1 wherein said bromine substituted methylsiloxane is a hydroxyl-terminated polymer composed of methyl-bromo-methyl-siloxane units obtained by treating methyl-bromomethyl-dichlorosilane with an excess of water and said methylpolysiloxane is alpha-ω-bis-(trimethylsiloxy)-polydimethyl-siloxane.

5. The methyl polysiloxane oxymethylene copolymer prepared by the process of claim 1.

6. A copolymer consisting of recurring structural units of the formula $(CH_3)_2SiCH_2OSi(CH_3)_2O \cdot 3.7Si(CH_3)_2O$ 7. A copolymer consisting of randomly distributed units of the formulae $Si(CH_3)_3O_{1/2}$, $Si(CH_3)_2O$ and $CH_3(SiCH_2)O_{3/2}$ References Cited by the Examiner
UNITED STATES PATENTS

| 2,983,745 | 5/61 | Speier | 260—448.2 |
| 2,993,871 | 7/61 | Shannon et al. | 260—2 |
| 3,109,854 | 11/63 | Ender | 260—2 |

FOREIGN PATENTS

| 570,061 | 2/59 | Canada. |

OTHER REFERENCES

Chemical Reviews, George et al., December 1956, vol. 6, number 6, page 1126 relied on.

LEON J. BERCOVITZ, *Primary Examiner.*

MORRIS LIEBMAN, WILLIAM H. SHORT, MURRAY TILLMAN, *Examiners.*